US008683657B2

(12) United States Patent
Lin

(10) Patent No.: US 8,683,657 B2
(45) Date of Patent: Apr. 1, 2014

(54) PRESS BUTTON-CONTROLLED RETRACTABLE BAR

(76) Inventor: Thomas Lin, Taichung (TW)

( * ) Notice: Subject to any disclaimer, the term of this patent is extended or adjusted under 35 U.S.C. 154(b) by 0 days.

(21) Appl. No.: 13/597,595

(22) Filed: Aug. 29, 2012

(65) Prior Publication Data

US 2014/0059808 A1 Mar. 6, 2014

(51) Int. Cl.
*B25G 1/04* (2006.01)
*F16B 7/10* (2006.01)

(52) U.S. Cl.
USPC ........................... 16/429; 16/426; 16/DIG. 41

(58) Field of Classification Search
USPC ......... 16/113.1, 405, 426, 427, 429, DIG. 25, 16/DIG. 41; 30/296.1; 294/19.1; 190/18 A, 190/115; 280/47.17, 47.315, 47.371
See application file for complete search history.

(56) References Cited

U.S. PATENT DOCUMENTS 1,563,489 A * 12/1925 Hooppaw et al. ............. 292/220
3,153,252 A * 10/1964 Ricciardi ..................... 15/144.4
3,306,639 A * 2/1967 Lyon ............................ 403/107
3,347,575 A * 10/1967 Morris .......................... 403/107
3,366,406 A * 1/1968 Morris .......................... 403/107
5,593,196 A * 1/1997 Baum et al. ................... 294/174
5,862,898 A * 1/1999 Chang ........................... 190/115
5,909,760 A * 6/1999 Tsai ................................ 16/429
6,339,979 B1 * 1/2002 Chiang ........................ 81/177.2
6,461,074 B2 * 10/2002 Taylor ........................... 403/378
6,546,596 B2 * 4/2003 Grote et al. ..................... 16/429
6,595,713 B1 * 7/2003 Wilson .............................. 403/7
6,609,271 B2 * 8/2003 Kuo ............................. 16/113.1
6,619,448 B1 * 9/2003 Wang ............................ 190/115
6,668,423 B1 * 12/2003 Chen ........................... 16/113.1
6,668,424 B1 * 12/2003 Allen et al. ...................... 16/444
6,883,208 B1 * 4/2005 Huang ............................ 16/429
7,347,123 B1 * 3/2008 Toole et al. ....................... 81/20
7,484,267 B2 * 2/2009 Yeh ............................. 16/113.1
7,497,490 B2 * 3/2009 Yamaguchi ..................... 292/262
7,574,806 B2 * 8/2009 Wang .............................. 30/340
7,681,285 B2 * 3/2010 Hua ................................ 16/422
7,694,387 B1 * 4/2010 Huang ......................... 16/113.1
7,774,901 B1 * 8/2010 Huang ............................ 16/429
2002/0095745 A1 * 7/2002 Wang .............................. 16/405
2003/0009853 A1 * 1/2003 Kuo ................................ 16/405
(Continued)

FOREIGN PATENT DOCUMENTS

GB 2423275 A * 8/2006
GB 2424201 A * 9/2006
TW 556480 U 10/2003

*Primary Examiner* — Victor Batson
*Assistant Examiner* — Jason W San
(74) *Attorney, Agent, or Firm* — Muncy, Geissler, Olds & Lowe, P.C.

(57) ABSTRACT

A retractable bar includes an inner tube, an outer tube and a positioning assembly. The outer tube has a longitudinal sliding groove and multiple locating notches. The outer tube is axially movably sleeved onto the inner tube. The positioning assembly has a positioning block and a press button. The positioning block is accommodated in the longitudinal sliding groove, and the positioning block has a positioning protrusion and a threaded hole. The press button has a threaded portion engaged with the threaded hole and is movable between a first position where the positioning protrusion is forced into engagement with one of the locating notches to lock the outer and inner tubes and a second position where the positioning protrusion is disengaged from each locating notch for allowing the axial relative movement of the outer tube to the inner tube for adjustment of the length of the retractable bar.

5 Claims, 4 Drawing Sheets

(56) References Cited

U.S. PATENT DOCUMENTS

| | | | | |
|---|---|---|---|---|
| 2003/0123926 | A1* | 7/2003 | Lin | 403/109.5 |
| 2006/0156554 | A1* | 7/2006 | Lin | 30/341 |
| 2006/0193679 | A1* | 8/2006 | Lin | 403/109.5 |
| 2006/0282988 | A1* | 12/2006 | Lin | 16/429 |
| 2007/0003361 | A1* | 1/2007 | Wang | 403/109.3 |
| 2009/0107788 | A1* | 4/2009 | Lin | 190/115 |
| 2009/0119881 | A1* | 5/2009 | Liu | 16/429 |
| 2011/0101716 | A1* | 5/2011 | Nolte et al. | 294/19.1 |
| 2011/0119869 | A1* | 5/2011 | Martin | 16/429 |
| 2012/0228854 | A1* | 9/2012 | Mountz | 280/655.1 |

* cited by examiner

PRESS BUTTON-CONTROLLED RETRACTABLE BAR

BACKGROUND OF THE INVENTION

1. Field of the Invention

The present invention relates to a retractable bar for a tool and more particularly, to a press button-controlled retractable bar.

2. Description of the Related Art

To fit different application distances, regular hand tools (for example, garden shears) commonly provide a retractable design to enhance application convenience. For example, Taiwan Patent Publication Number 556480 discloses a retractable garden tool design, entitled "Improved structure of retractable handle for garden shears". When the user presses the press button of the retractable garden shears, a positioning block of a sliding block will be disengaged from a locating notch of an inner tube, allowing movement of the sliding block with an outer tube relative to the inner tube to adjust the length of the garden shears. After the retractable bar is adjusted to the desired length, the user can release the press button, enabling the press button to be returned to its former position by a spring member to force the positioning block of the sliding block into engagement with another locating notch of the inner tube. Thus, the inner tube is locked to the outer tube in the adjusted position.

However, in the aforesaid prior art design, the press button and the sliding block is joined together by means of engagement between a retaining flange of a mounting shaft of the press button and a retaining hole of a column of the sliding block and the insertion of a pin through the mounting shaft into the bottom side of the retaining hole of the sliding block. Further, in the aforesaid prior art design, a limiter tube and a stop block are respectively plugged into the outer tube and the inner tube to prevent the inner tube from escaping out of the outer tube. Generally speaking, the aforesaid prior art design is composed of a large number of component parts, complicating the installation procedure and increasing the manufacturing cost.

SUMMARY OF THE INVENTION

The present invention has been accomplished under the circumstances in view. It is the main object of the present invention to provide a press button-controlled retractable bar, which has a simple structure, facilitating installation and saving the manufacturing cost.

To achieve this and other objects of the present invention, a press button-controlled retractable bar comprises an inner tube, an outer tube, a positioning assembly, and a spring member. The inner tube comprises a longitudinal sliding groove extending along the length thereof, and a plurality of locating notches located on a sidewall of the longitudinal sliding groove and spaced axially along the length of the inner tube. The outer tube is sleeved onto the inner tube, and movable axially along the length of the inner tube. The positioning assembly comprises a sleeve, a positioning block, and a press button. The sleeve is sleeved onto the outer tube. The positioning block is accommodated in the longitudinal sliding groove of the inner tube, comprising at least one protruding portion and a threaded hole. The press button is pressably mounted at the sleeve, comprising a threaded portion engaged the threaded hole of the positioning block. When the press button is in a first position, each protruding portion of the positioning block is forced into engagement with one of the locating notches of the inner tube to lock the outer tube to the inner tube. When the press button is moved from the first position to a second position, each protruding portion of the positioning block is disengaged from each locating notch of the inner tube, allowing the outer tube to be moved axially relative to the inner tube to adjust the length of the press button-controlled retractable bar. The spring member is disposed between the press button and the sleeve to support the press button in the first position.

Thus, subject to the design of the screw joint between the press button and the positioning block, the invention reduces the number of component parts of the press button-controlled retractable bar, facilitating the installation procedure of the press button-controlled retractable bar and saving its manufacturing cost.

DETAILED DESCRIPTION OF THE INVENTION

Figure 1:
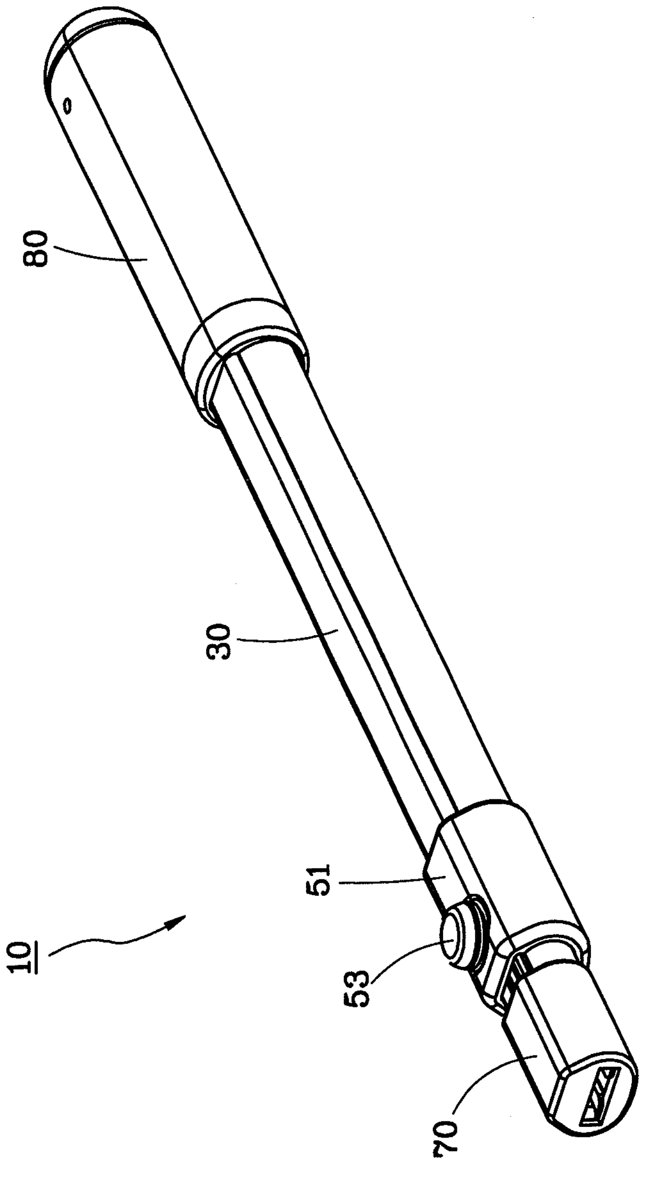
FIG. 1 is a perspective view of a press button-controlled retractable bar in accordance with the present invention.
Figure 2:
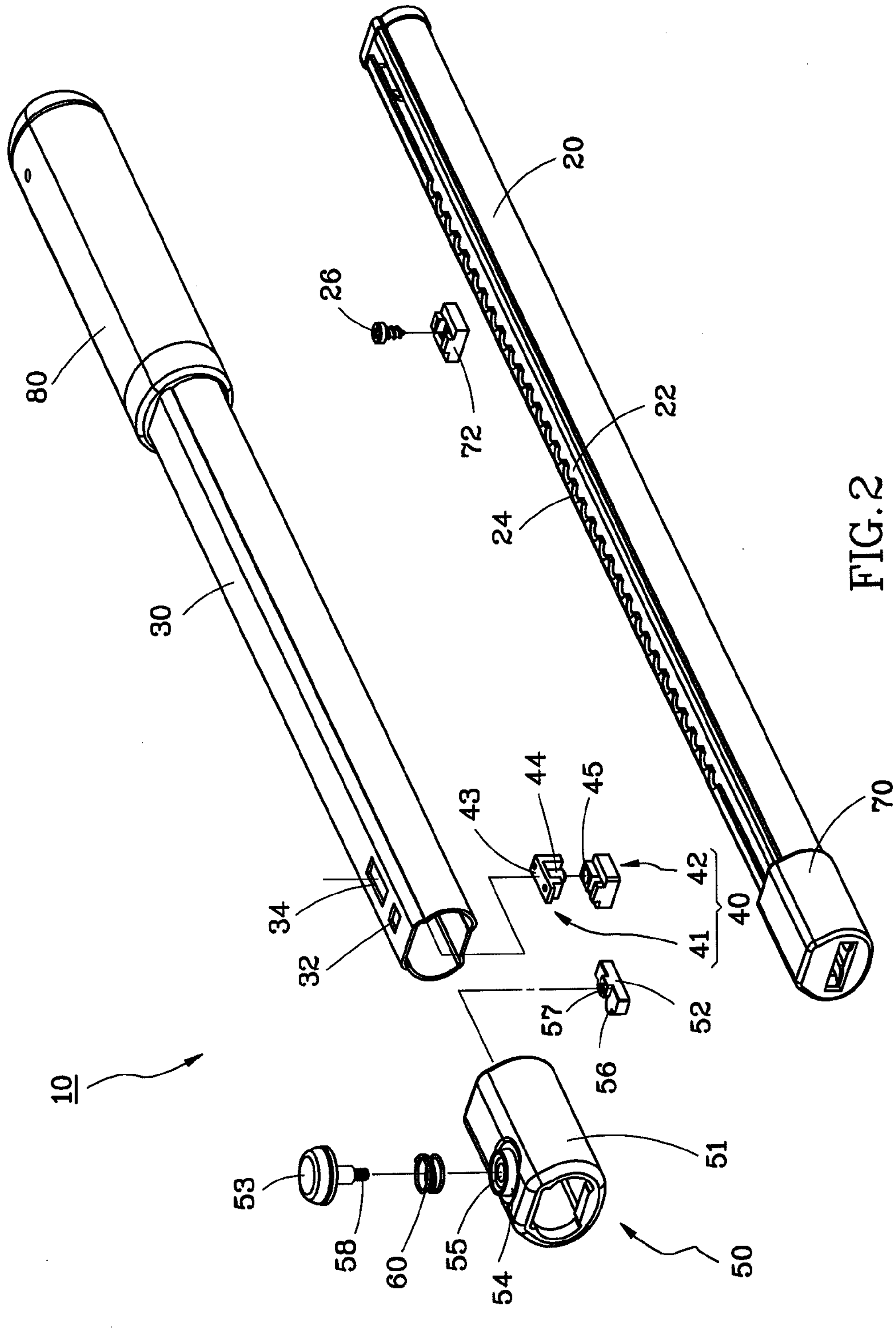
FIG. 2 is an exploded view of the press button-controlled retractable bar in accordance with the present invention.

Referring to FIGS. 1 and 2, a press button-controlled retractable bar 10 in accordance with a first embodiment of the invention is shown. The press button-controlled retractable bar 10 comprises an inner tube 20, an outer tube 30, a positioning assembly 50, and a spring member 60.

The inner tube 20 comprises a longitudinal sliding groove 22 extending in the axial direction of the inner tube 20, a plurality of locating notches 24 located on a sidewall of the longitudinal sliding groove 22 and spaced along the axial direction of the inner tube 20. Further, an end block 70 is fastened to the inner tube 20 to block one end of the longitudinal sliding groove 22. Further, a stop block 72 is affixed to the inner tube 20 by a screw 26 to block an opposite end of the longitudinal sliding groove 22.

The outer tube 30 has its one end mounted with a grip 80, and its other end sleeved onto the inner tube 20 in such a manner that the outer tube 30 can be moved axially back and forth relative to the inner tube 20. The outer tube 30 comprises a first through hole 32 disposed in communication with the longitudinal sliding groove 22 of the inner tube 20, and a mounting slot 34 disposed adjacent to the first through hole 32.

To prevent the outer tube 30 from escaping out of the inner tube 20, the press button-controlled retractable bar 10 further includes a sliding device 40 having an upper block member 41 and a lower block member 42. The sliding device 40 is accommodated in the longitudinal sliding groove 22 of the inner tube 20. The upper block member 41 comprises a mounting portion 43 mounted to the mounting slot 34 of the outer tube 30, and a plug portion 44 downwardly extended from a bottom wall of the mounting portion 43. The lower block member 42 comprises a socket 45, which receives the plug portion 44 of the upper block member 41. Thus, when the outer tube 20 is moved axially relative to the inner tube 20, the sliding device 40 will be carried by the outer tube 30 to move along the longitudinal sliding groove 22 of the inner tube 20. Further, the sliding device 40 can be stopped by the stop block 72 for preventing the outer tube 30 from escaping out of the inner tube 20 when it is being moved along the longitudinal sliding groove 22 of the inner tube 20.

Figure 3:
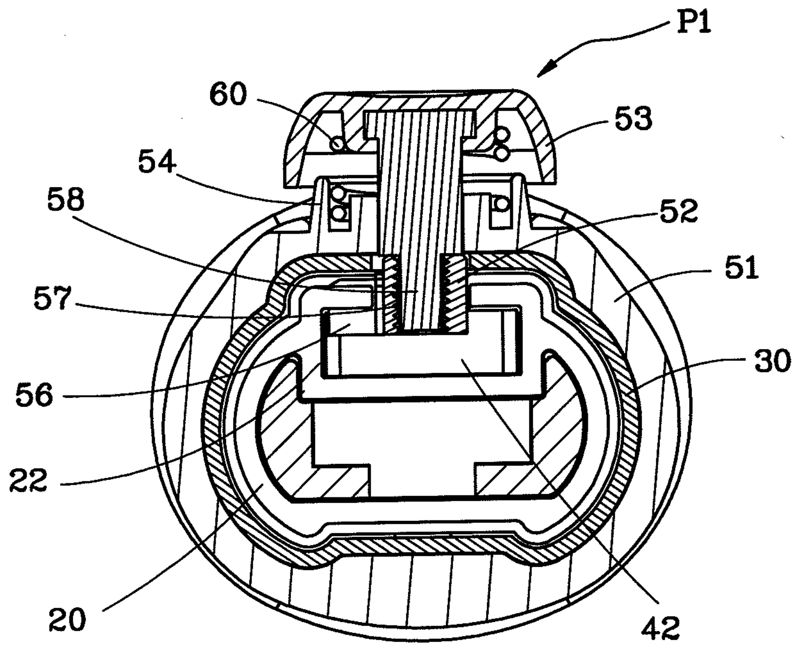
FIG. 3 is a transverse sectional view of the press button-controlled retractable bar in accordance with the present invention, illustrating the press button in the first position.

The positioning assembly 50 comprises a sleeve 51, a positioning block 52, and a press button 53. The sleeve 51 is sleeved onto the outer tube 30, and the sleeve 51 has an annular flange 54 protruded from the periphery thereof and a second through hole 55 cut through the periphery thereof and surrounded by the annular flange 54. The second through hole 55 is further kept in communication with the first through hole 32 of the outer tube 30. The positioning block 52 is accommodated in the longitudinal sliding groove 22 of the inner tube 20, comprising at least one positioning protrusion 56 and a threaded hole 57. According to the present preferred embodiment, the positioning block 52 comprises two positioning protrusions 56 respectively engaged into two respective locating notches 24 of the inner tube 20. The press button 53 comprises a threaded portion 58 inserted through the second through hole 55 of the sleeve 51 and the first through hole 32 of the outer tube 30 and then threaded into the threaded hole 57 of the positioning block 52 in the longitudinal sliding groove 22 of the inner tube 20 for enabling the synchronous movement of the positioning block 52 and the press button 53. Thus, when the press button 53 receives no external pressure, it is kept in a first position P1, as shown in FIG. 3, and each of the positioning protrusions 56 of the positioning block 52 are kept engaged with one of the locating notches 24 of the inner tube 20. When the press button 53 is forced by an external force to move from the first position P1 to a second position P2, as shown in FIG. 5, each of the positioning protrusions 56 of the positioning block 52 are disengaged from the respective locating notches 24 of the inner tube 20.

The spring member 60 is sleeved onto the annular flange 54 of the sleeve 51 and stopped with the two opposite ends thereof against the sleeve 51 and the press button 53 respectively for holding the press button 53 in the first position P1.

Figure 5:
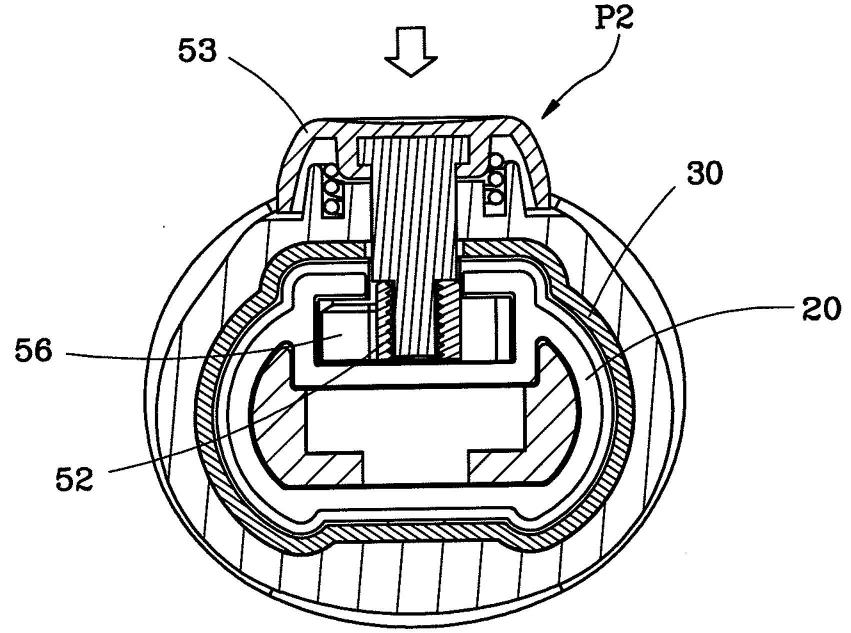
FIG. 5 is similar to FIG. 3, illustrating the press button in the second position.
Figure 4:
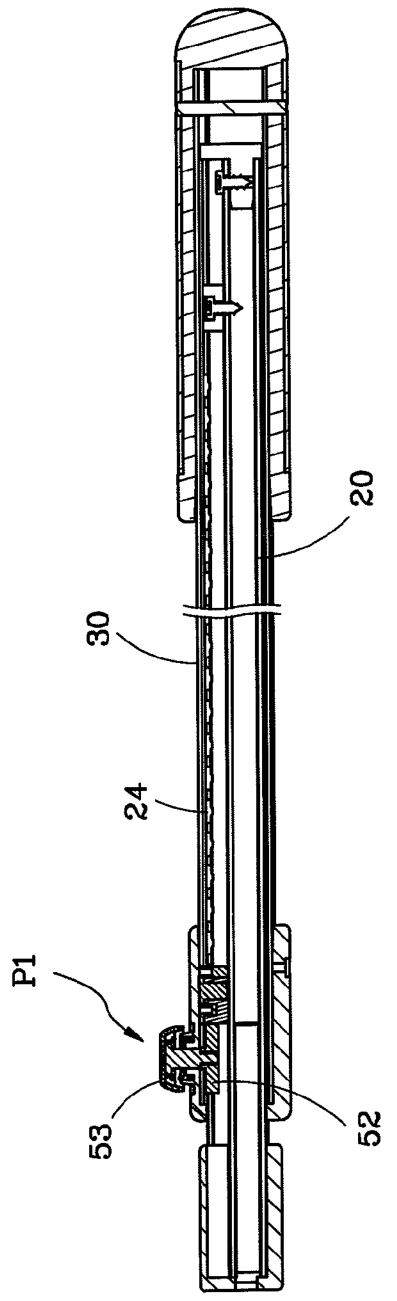
FIG. 4 is a longitudinal sectional view of the present invention before adjustment of the length of the press button-controlled retractable bar.
Figure 6:
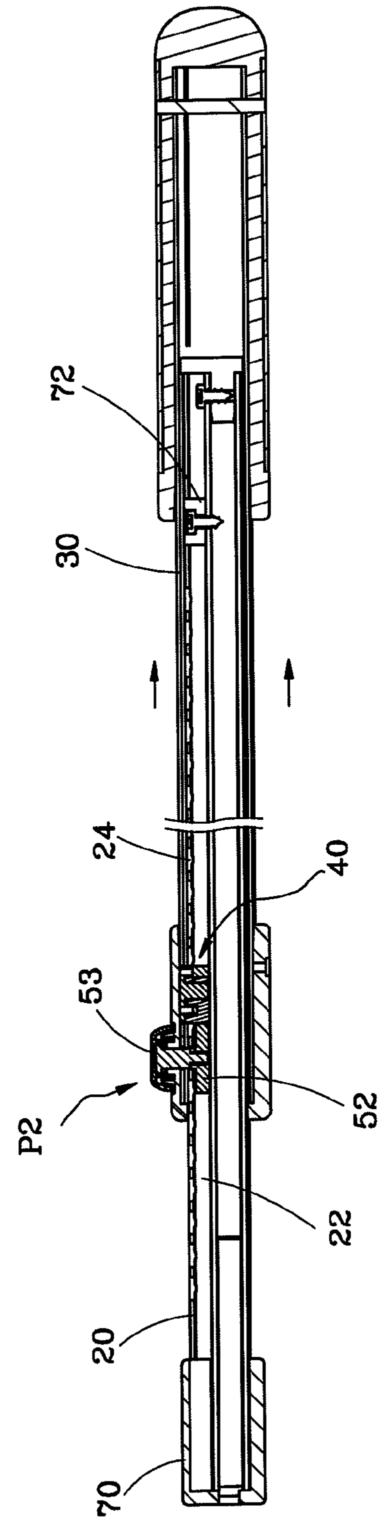
FIG. 6 is similar to FIG. 4, illustrating the length of the press button-controlled retractable bar adjusted.

For adjustment of the length of the press button-controlled retractable bar 10, a pressure is imparted to the press button 53 to move the press button 53 from the first position P1 to the second position P2 and to further force each of the positioning protrusions 56 of the positioning block 52 away from the locating notches 24 of the inner tube 20, as shown in FIGS. 5 and 6, and then push or pull the outer tube 30 relative to the inner tube 20 to adjust the press button-controlled retractable bar 10 subject to the desired length. During the movement of the outer tube 30, the outer tube 30 is prohibited from escaping out of the inner tube 20 subject to the effect of the end block 70 to stop against the sleeve 51 or the effect of the stop block 72 to stop against the sliding device 40. After the outer tube 30 has been moved to the desired position relative to the inner tube 20, the pressure imparted on the press button 53 is released, enabling the press button 53 to be returned to the first position P1 by the spring force of the spring member 60, as shown in FIG. 3. At this time, each of the positioning protrusions 56 of the positioning block 52 are forced into engagement with one of the locating notches 24 of the inner tube 20, locking the outer tube 30 to the inner tube 20 in the adjusted position.

In general, the press button-controlled retractable bar 10 of the present invention achieves connection between the press button 53 and the positioning block 52 by means of the matching arrangement between the threaded portion 58 of the press button 53 and the threaded hole 57 of the positioning block 52. When compared to the conventional matching design of retaining flange and retaining hole, the invention facilitates installation and eliminates the use of a pin for securing the press button and the positioning block, simplifying the installation procedure and reducing the manufacturing cost.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A press button-controlled retractable bar, comprising:

an inner tube comprising a longitudinal sliding groove and a plurality of locating notches located on a sidewall of said longitudinal sliding groove and spaced along an axial direction of said inner tube;

an outer tube axially movably sleeved onto said inner tube;

a positioning assembly comprising a sleeve sleeved onto said outer tube, a positioning block accommodated in said longitudinal sliding groove of said inner tube and covered by the outer tube, and a press button movably mounted at said sleeve in an radial direction of the sleeve, wherein said positioning block comprises at least one positioning protrusion and a threaded hole, and wherein said press button comprises a threaded portion engaged with said threaded hole of said positioning block and is movable between a first position where each positioning protrusion of said positioning block is selectively forced into engagement with one of said locating notches of said inner tube to lock said outer tube to said inner tube and a second position where each positioning protrusion of said positioning block is disengaged from said locating notches of said inner tube for allowing said outer tube to be moved axially relative to said inner tube;

a spring member disposed between said sleeve and said press button to support said press button in said first position;

a sliding device slidably received in said longitudinal sliding groove of said inner tube and connected to and driven by said outer tube for moving along said longitudinal sliding groove of said inner tube; and a stop block affixed to said inner tube at one end of said longitudinal sliding groove of said inner tube, said stop block being engageable with the sliding device to stop the sliding device when said sliding device is moved to the end of said longitudinal sliding groove.

2. The press button-controlled retractable bar as claimed in claim 1, wherein said outer tube comprises a mounting slot; said sliding device comprises an upper block member mounted to said mounting slot of said outer tube through a mounting portion of said upper block member, and a lower block member connected to said upper block member.

3. The press button-controlled retractable bar as claimed in claim 2, wherein said upper block member comprises a mounting portion mounted to said mounting slot of said outer tube, and a plug portion extended from said mounting portion; said lower block member comprises a socket for engagement with said plug portion of said upper block member.

4. The press button-controlled retractable bar as claimed in claim 1, wherein said outer tube comprises a first through hole disposed in communication with said longitudinal sliding groove of said inner tube; said sleeve comprises a second through hole disposed in communication with said first through hole of said outer tube; said threaded portion of said press button is inserted through said second through hole of said sleeve and then through said first through hole of said outer tube and threaded into said threaded hole of said positioning block in said longitudinal sliding groove of said inner tube.

5. The press button-controlled retractable bar as claimed in claim 4, wherein said sleeve comprises an annular flange protruded around said second through hole for holding said spring member.

* * * * *